H. T. Field,
Fruit Crate,
Nº 68,722.   Patented Sep. 10, 1867.
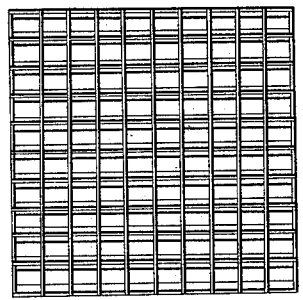
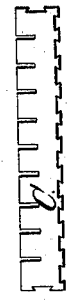
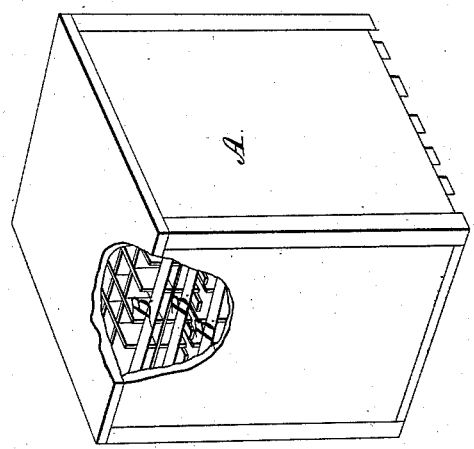
Witnesses.
Samuel T. Field
James G. Arnold
Inventor.
H. T. Field

UNITED STATES PATENT OFFICE.

HORACE T. FIELD, OF WORCESTER, MASSACHUSETTS.

IMPROVEMENT IN FRUIT-SAFE.

Specification forming part of Letters Patent No. 68,722, dated September 10, 1867.

*To all whom it may concern:*

Be it known that I, HORACE T. FIELD, of Worcester, in the county of Worcester, State of Massachusetts, have invented certain new and useful improvements in vessels for preserving and transporting fruit, called a Fruit-Safe; and I do hereby declare the following to be a full, clear, and exact description of the same, due reference being had to the accompanying drawings by the letters of reference marked thereon, in which drawings—

Figure 1 shows a view of my fruit-safe, with a portion of the top and one side removed to show the filling-trays. Fig. 2 shows a single tray separate, and Fig. 3 one of the pieces of the same, the same letters indicating the same parts where they occur in each.

A is the case, with its bottom or top made of slats or perforated, and filled with the trays B B, which trays are made of pieces like C, Fig. 3, halved together, and with slats dovetailed into their ends and across the bottom, making separate compartments, as shown in Fig. 2, to keep the fruit separate and allow the necessary circulation of air, the fruit for preserving being wrapped in paper or similar material, though for transportation this is not necessary, these trays giving great facility for inspecting the fruit and shifting it from one case to another without injury from handling or bruising, which adds much to its keeping, the cases and trays being made uniform and of proper size and capacity for the fruit for which they are intended.

I am aware that trays have been used for small fruit, and crates of various kinds are used, and that it is not new to halve pieces together. These I do not claim; but

What I claim as new, and desire to secure by Letters Patent, is—

The fruit-safe composed of the peculiarly-constructed trays, in connection with the cases, as shown, the whole constructed and operating in the manner and for the purposes as above set forth and described.

H. T. FIELD.

Witnesses:
SAMUEL T. FIELD,
JAMES G. ARNOLD.